United States Patent [19]

Rowlett

[11] Patent Number: 5,429,016

[45] Date of Patent: Jul. 4, 1995

[54] AGRICULTURAL DISC BLADE

[75] Inventor: Don C. Rowlett, Bedford, Pa.

[73] Assignee: Kennametal Inc., Latrobe, Pa.

[21] Appl. No.: 204,973

[22] Filed: Mar. 2, 1994

Related U.S. Application Data

[62] Division of Ser. No. 898,640, Jun. 15, 1992, Pat. No. 5,297,637.

[51] Int. Cl.⁶ .................................. B21K 23/00
[52] U.S. Cl. ........................... 76/115; 30/347; 125/15
[58] Field of Search .............. 30/347; 51/13.01, 15; 299/89; 125/15; 83/676; 76/115, DIG. 11, DIG. 12; 451/548

[56] References Cited

U.S. PATENT DOCUMENTS

| | | | |
|---|---|---|---|
| 1,859,973 | 5/1932 | Metzger | 76/115 X |
| 2,808,044 | 10/1957 | Upper et al. | 125/15 |
| 2,894,583 | 7/1959 | Johnstad | 164/70 |
| 3,049,843 | 8/1962 | Christensen | 125/15 X |
| 3,657,845 | 4/1972 | Sekiya | 51/206 R |
| 3,663,063 | 5/1972 | Johnmeyer, Sr. | 299/89 |
| 3,820,849 | 6/1974 | Lundstrom et al. | 299/93 |
| 3,995,699 | 12/1976 | Blucher et al. | 127/719 |
| 4,043,404 | 8/1977 | Sorlie et al. | 172/555 |
| 4,059,161 | 11/1977 | Smith et al. | 172/60 |
| 4,094,362 | 6/1978 | Hild | 172/120 |
| 4,241,633 | 12/1980 | De Luca | 83/676 |
| 4,291,667 | 9/1981 | Eichenlaub et al. | 125/15 |
| 4,469,185 | 9/1984 | Fox et al. | 172/540 |
| 4,598,654 | 7/1986 | Robertson et al. | 111/88 |
| 4,854,295 | 8/1989 | Sakarcan | 125/15 |
| 4,958,457 | 9/1990 | Doskocil | 37/94 |
| 4,978,254 | 12/1990 | Langlois et al. | 407/33 |

FOREIGN PATENT DOCUMENTS

| | | | |
|---|---|---|---|
| 941251 | 7/1949 | Germany | 83/676 |
| 1190163 | 4/1965 | Germany | 83/676 |
| 877573 | 9/1961 | United Kingdom | 51/209 R |
| 932583 | 5/1962 | United Kingdom | . |

OTHER PUBLICATIONS

Adams Self-Sharpening Hard-Faced Disc Blades brochure, Adams Hard-Facing Company, 1979.

"Pat. No. 4,098,622 tells the whole story!" advertisement, J. I. Case, O.E.M., 1990.

*Primary Examiner*—Douglas D. Watts
*Attorney, Agent, or Firm*—John J. Prizzi

[57] ABSTRACT

An agricultural tool including a disc blade incorporating hard wear resistant inserts for attachment to an axial member of an agricultural tool for rotation through the soil. The disc blade includes parallel spaced flat round front and rear surfaces having a central cylindrical opening. The front surface tapers radially outwardly to the rear surface thereby defining a common outer rim having a knife edge. A plurality of notches are spaced circumferentially along the front surface of the disc blade and inwardly from the outer edge of the front surface of the disc blade. The notches are configured to receive a plurality of hard wear resistant inserts to provide improved wear resistance.

4 Claims, 2 Drawing Sheets

AGRICULTURAL DISC BLADE

This is a divisional of application Ser. No. 07/898,640 filed on Jun. 15, 1992, now U.S. Pat. No. 5,297,637.

FIELD OF THE INVENTION

This invention relates to agricultural disc blades. More particularly, this invention relates to agricultural disc blades including hard wear resistant inserts for use on agricultural tools such as coulter, trash and furrow opening tools and a method of making agricultural disc blades including hard wear resistant inserts.

BACKGROUND OF THE INVENTION

An agricultural disc blade is a thin circular metal disc having a knife edge for use on conventional coulter, trash and furrow opening tools for forming a trench or furrow. In operation, at least one disc blade is connected to an axial member of an axially powered agricultural tool and rolled through the soil to form a trench or furrow. It will be appreciated that as the disc blade rolls through the soil the disc blade encounters a wide variety of abrasive materials such as high silica soil, rocks, debris and the like, all of which promote wear of the disc blade. A worn disc blade causes mulch hairpinning and soil buildup which results in a "bull dozing" of soil within the furrow.

In an effort to solve this problem, disc blades on agricultural tools are currently stamped out of high carbon steels and either machined or ground to obtain a sharp knife edge. The disc blades are then heat treated to a high hardness to improve resistance to wear.

Although the heretofore known disc blades have been proven to perform satisfactorily, further improvements on the durability and wear of disc blades is desired. Accordingly, one aspect of the present invention is to provide a disc blade that is wear resistant and simple and economical to manufacture. Another aspect of the present invention is to provide a disc blade which retains its gauge and sharpness longer than prior known disc blades to maintain a cutting and pushing aside action of mulch and soil for more efficient planting and working of the soil. Another aspect of the present invention is to provide a disc blade that will not necessitate replacement as frequently as prior disc blades thereby requiring less agricultural equipment downtime.

SUMMARY OF THE INVENTION

Briefly according to this invention, there is provided an agricultural tool including a disc blade for attachment to an axial member of the agricultural tool for rotation through the soil. The disc blade includes parallel spaced flat circular front and rear surfaces having a central cylindrical opening. The front surface tapers radially outwardly to the rear surface thereby defining a common outer rim having an outer knife edge. A plurality of notches are spaced circumferentially along the front surface of the disc blade and inwardly from the outer edge of the front surface of the disc blade. The notches are configured to receive a plurality of hard wear resistant inserts. Each insert includes a horizontal planar bottom surface having a front edge and a rearward edge, a planar front surface including an arcuate top edge and extending at an angle upwardly and inwardly from the rearward edge of the bottom surface, a planar back surface including a linear bottom edge extending vertically downward from the arcuate top edge of the front surface and a corner surface extending at an angle downwardly from the bottom edge of the back surface to the rearward edge of the bottom surface. The inserts are made of WC-Co.

In a preferred embodiment, the arcuate top edge of the insert is spaced from the outer edge of the front surface.

In accordance with another aspect of the present invention, a new and improved method of making a disc blade incorporating hard wear resistant inserts is disclosed. The new and improved method broadly includes the steps of providing a disc having parallel spaced flat round front and rear surfaces having a central cylindrical opening, the front surface tapering radially outwardly to the rear surface thereby defining a common outer rim having an outer knife edge. Next, a plurality of circumferentially spaced notches within the front surface of the disc blade and spaced from the outer edge of the disc blade are formed by stamping or machining. Finally, inserts of a hard refractory metal are secured within each notch by brazing.

BRIEF DESCRIPTION OF THE DRAWINGS

Further features and other advantages of this invention will become clear from the following detailed description made with reference to the drawings in which.

DESCRIPTION OF THE PREFERRED EMBODIMENTS

Figure 1:
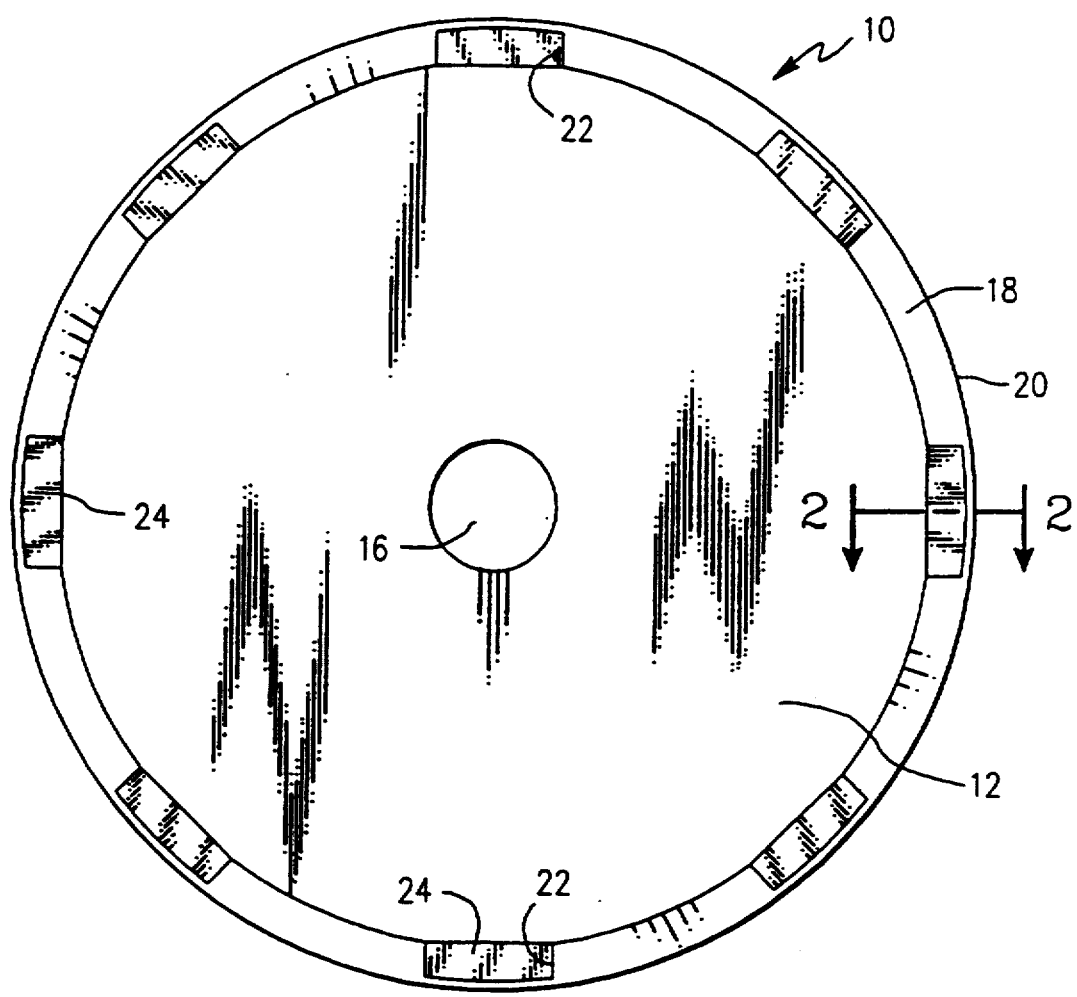
FIG. 1 is a side view of a disc blade in accordance with the present invention.

In the following description like reference characters represent like or corresponding elements. Also, in the following description, it is to be understood that such terms as "forwardly", "rearwardly", "upwardly", "downwardly", and the like are words of convenience and are not to construed as limiting terms.

Figure 2:
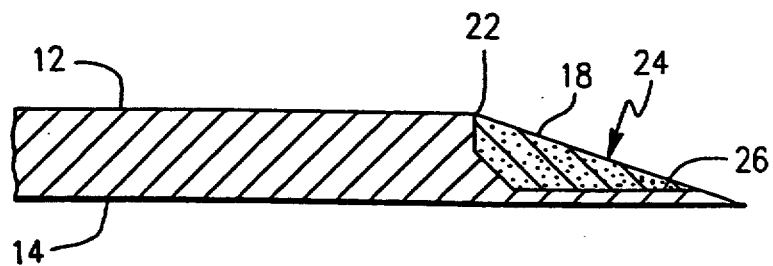
FIG. 2 is a partial cross-sectional view of FIG. 1 taken along line 2—2.

Referring now to FIG. 1, there is shown a disc blade 10 for use on an agricultural tool such as a coulter, trash or furrow forming tool. The disc blade 10 is generally circular having spaced parallel flat front and rear surfaces 12 and 14. A cylindrical opening 16 is formed through the center of the front and rear surfaces 12 and 14 of the disc blade 10 for attachment to an axial member of the agricultural tool for rotation through the soil. The front surface 12 tapers radially outwardly to the rear surface 14 thereby defining a common outer rim 18 having a knife edge 20. As shown in FIG. 2, the outer knife edge rim cross-section is generally a right triangle with the front surface 12 forming the hypotenuse of the right triangle.

A plurality of circumferentially spaced notches 22 are formed within the front surface 12 of the disc blade 10 and spaced from the outer edge 20 of the disc blade to receive a plurality of inserts 24. As shown in FIG. 2, the notches 22 are generally triangular in cross section having a supporting back 26 formed from the rear surface 14 of the disc blade 10. The notches 22 may be formed within the disc blade 10 as the disc blade is manufactured, e.g. by stamping, or the notches may be formed within the disc blade by machining or the like after the disc blade is manufactured. Whichever method of manufacture is employed, the disc blade notches 22 are constructed so as to accommodate the shape of the hard wear resistant insert 24 secured therein.

Figures 3, 4, 5, 6, 7:
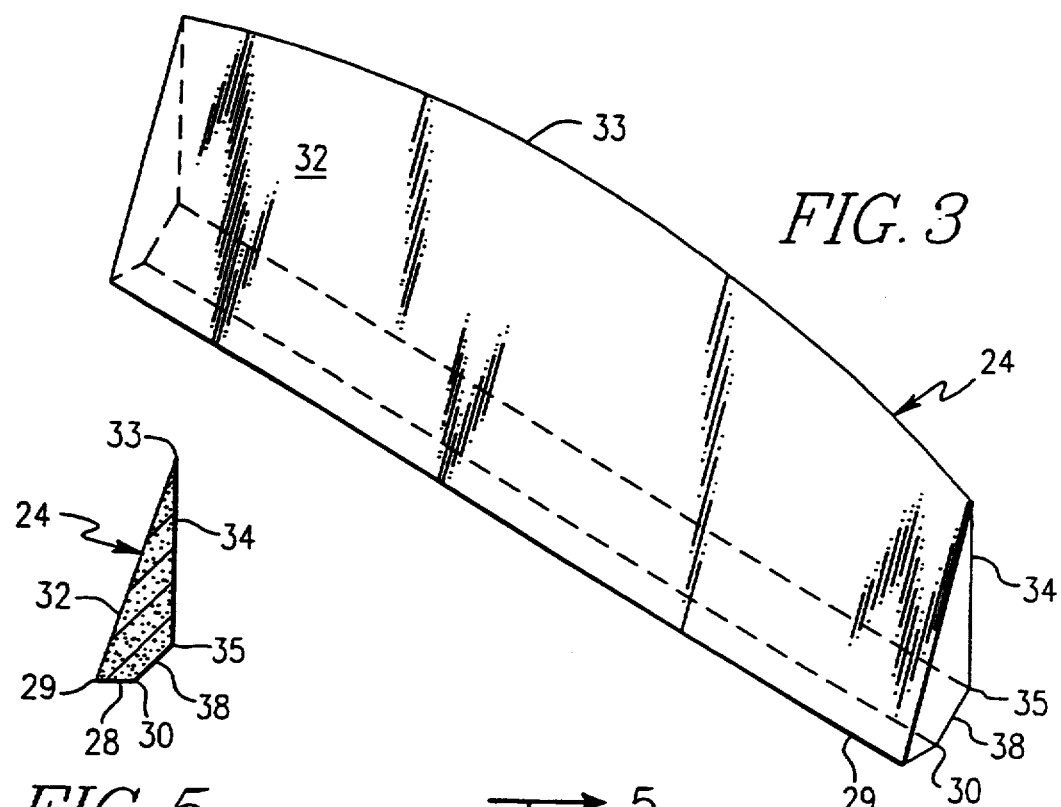
FIG. 3 is an isometric view of a hard wear resistant insert in accordance with the present invention.
FIG. 4 is a rear view of the insert of FIG. 3.
FIG. 5 is a cross-sectional view of the insert of FIG. 4 taken along line 5—5.
FIG. 6 is a top view of the insert of FIG. 3.
FIG. 7 is a bottom view of the insert of FIG. 3.

As shown in FIG. 3, each insert 24 is generally of an elongated triangle configuration having a corner surface which may be either rounded or, in a preferred embodiment, beveled. More particularly, as shown in FIGS. 4–7, each insert 24 includes a horizontal planar bottom surface 28 having a front edge 29 and a rearward edge 30, a planar front surface 32 having an arcuate top edge 33 and extending at an angle upwardly and inwardly from the front edge 29 of the bottom surface 28, a planar back surface 34 having a linear bottom edge 35 positional vertically below the arcuate top edge 33 of the front surface 32 and a corner surface 38 extending at an angle downwardly from the bottom edge 35 of the back surface 34 to the rearward edge 30 of the bottom surface 28.

The hard wear resistant insert 24 may be made of a hard refractory metal such as WC-Co (Tungsten Carbide-Cobalt Alloy) of a type obtainable from Kennametal Inc. under the grade designation K3030C.

The bottom surface 28, corner surface 38 and back surface 34 of each insert 24 is secured to the complimentary supporting back 26 of the notch 22 by brazing techniques well known in the art.

It will be appreciated that applicant has found that a disc blade 10 employing a plurality of inserts 24 of a shape as disclosed herein provides substantially improved wear resistance and impact/strength toughness over prior disc blades.

Having described presently preferred embodiments of the invention, it is to be understood that it may be otherwise embodied within the scope of the appended claims.

What is claimed is:

1. A method of making a disc blade including a plurality of hard wear resistant inserts made of a hard refractory metal for use on an agricultural tool comprising the steps of:
   a) providing a disc having parallel spaced flat circular front and rear surfaces having a central cylindrical opening, the front surface tapering radially outwardly to the rear surface thereby defining a common outer rim having a knife edge,
   b) forming a plurality of circumferentially spaced notches within the front surface of the disc blade and spaced from the outer edge of the disc blade, and
   c) securing an insert of a hard refractory metal within each notch.

2. The method of claim 1 wherein the notches are formed by stamping.

3. The method of claim 1 wherein the notches are formed by machining.

4. The method of claim 1 wherein said inserts are secured within the notches by brazing.

* * * * *